United States Patent [19]

Green et al.

[11] 4,185,313

[45] Jan. 22, 1980

[54] DISC MEMORY MODULE DUST SHIELD

[75] Inventors: Paul N. Green; James A. Duff, both of Omaha, Nebr.

[73] Assignee: Magnetic Peripherals Inc., Minneapolis, Minn.

[21] Appl. No.: 945,722

[22] Filed: Sep. 25, 1978

[51] Int. Cl.² ............... G11B 23/04; G11B 17/26
[52] U.S. Cl. ....................... 360/133; 206/444
[58] Field of Search .................. 360/133, 97–99, 360/135; 206/444, 309, 312

[56] References Cited

U.S. PATENT DOCUMENTS

| 3,526,884 | 9/1970 | Buslik et al. | 206/444 |
| 3,593,327 | 7/1971 | Shill | 206/444 |
| 3,635,608 | 1/1972 | Crouch et al. | 206/444 |
| 3,917,068 | 11/1975 | Cheney | 360/133 |
| 4,071,862 | 1/1978 | Lathrop et al. | 360/133 |

*Primary Examiner*—Alfred H. Eddleman
*Attorney, Agent, or Firm*—Edward L. Schwarz

[57] ABSTRACT

An improved means for attaching the detachable type of dust shield to a disc memory assembly.

9 Claims, 6 Drawing Figures

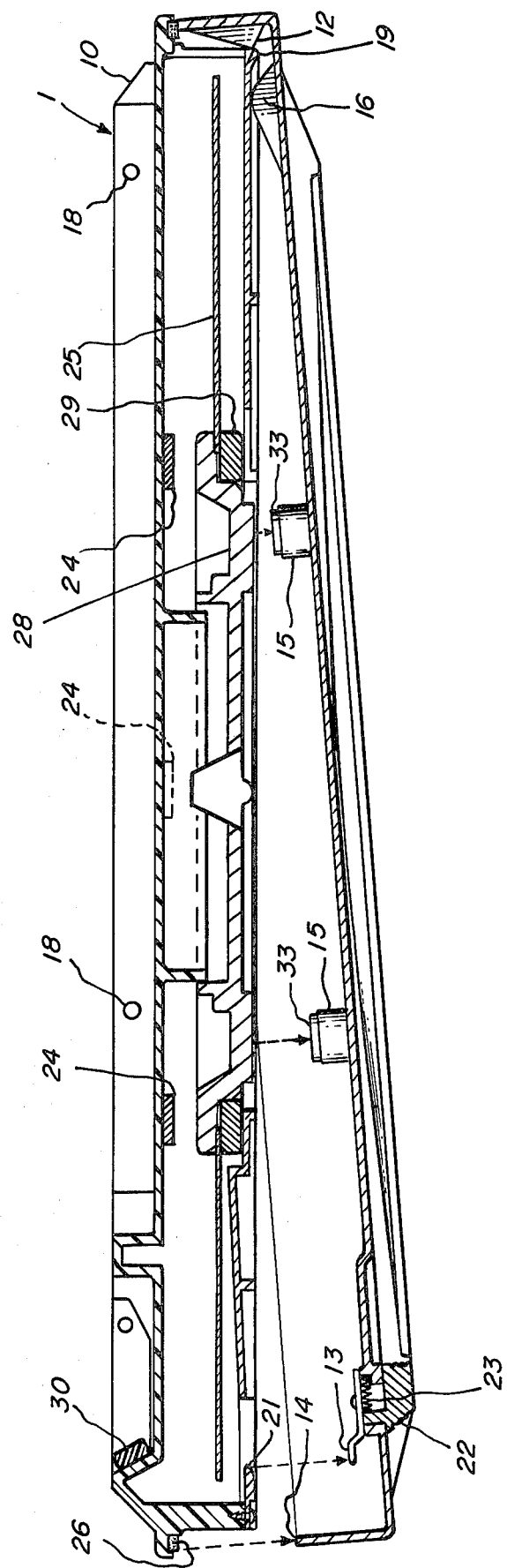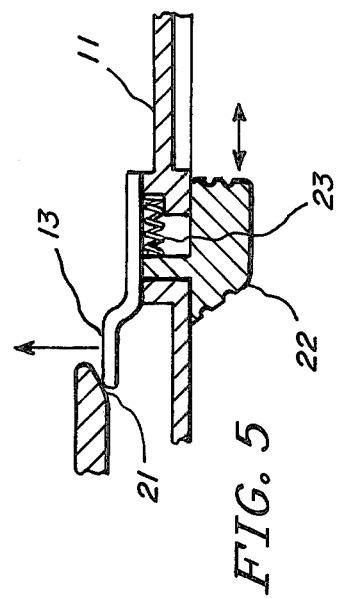

DISC MEMORY MODULE DUST SHIELD

BACKGROUND

In the typical disc memory, the recording medium used is a detachable disc module. Typically, an installation will have many mechanically identical modules which can be mounted in any drive designed to accept them. Because of the problem of dust and dirt contaminating the disc and causing the read/write head to rub the recording surface from the disc, the usual procedure is to protect the disc from dust and dirt when not in the drive by enclosing it in a housing. As one might expect, a large number of different approaches have been employed in designing such housings. One approach has been to design the housing so that it is totally removed from the disc when the disc is mounted in the drive. Another approach employs a housing which permanently encloses the disc, and has one or more access doors permanently attached to the housing, and which are opened at some stage of the mounting procedure to allow access to the disc. A third approach is a composite of these two, employing a permanent housing and a so-called "bottom cover" or dust shield which is detached just prior to mounting the module in the drive.

BRIEF DESCRIPTION OF THE INVENTION

This invention pertains to this last type of disc module which include a detachable dust shield. It particularly pertains to means for attaching and retaining the dust shield so as to efficiently seal the access ports from dust and dirt, and yet permit easy detaching and attaching of the dust shield to the permanent housing. This is accomplished by a projection and lip, one of each carried by each of the housing and the dust shield adjacent the periphery of each. They are arranged to lockingly engage when the dust shield is mated with the module housing. Approximately diametrically opposed to the projection and lip is a latch and striker, one of each again carried by each of the housing and dust shield adjacent their peripheries. They are arranged such that when the edge of the dust shield adjacent the latch and striker is pushed toward its mated position with the module housing, the latch engages the striker, locking the dust shield to the housing. The latch incorporates a release mechanism allowing it to disengage the striker, releasing the dust shield from the housing. Decreasing width guideways which engage lugs adjacent the projection can be used to guide the projection accurately to the lip. By forming the projection and/or the lip with a ramping surface, the radial movement of the shield with respect to the housing can force the edge of the shield's mating surface against the similar surface of the housing, thereby assuring a tight dust-free fit.

Accordingly, one purpose of this invention is to provide a dust shield which may easily be attached to and detached from a disc memory module housing.

A second purpose is to provide positive pressure between the dust shield and the housing along their mating surfaces so as to better exclude dust and dirt.

Yet another purpose of this invention is to clamp the disc within the module housing into a fixed position to prevent its rattling, when the dust shield is attached.

Other purposes and advantages of this invention will become evident during the following description and explanation.

BRIEF DESCRIPTION OF THE DRAWINGS

FIG. 4 is a cross-sectional view of the module with the dust shield positioned with the lip and projection engaged and showing movement of the housing toward the dust shield to cause them to lock together.

FIG. 5 is a detail of the latch and striker in the process of engaging.

DESCRIPTION OF THE PREFERRED EMBODIMENT

Figure 1:
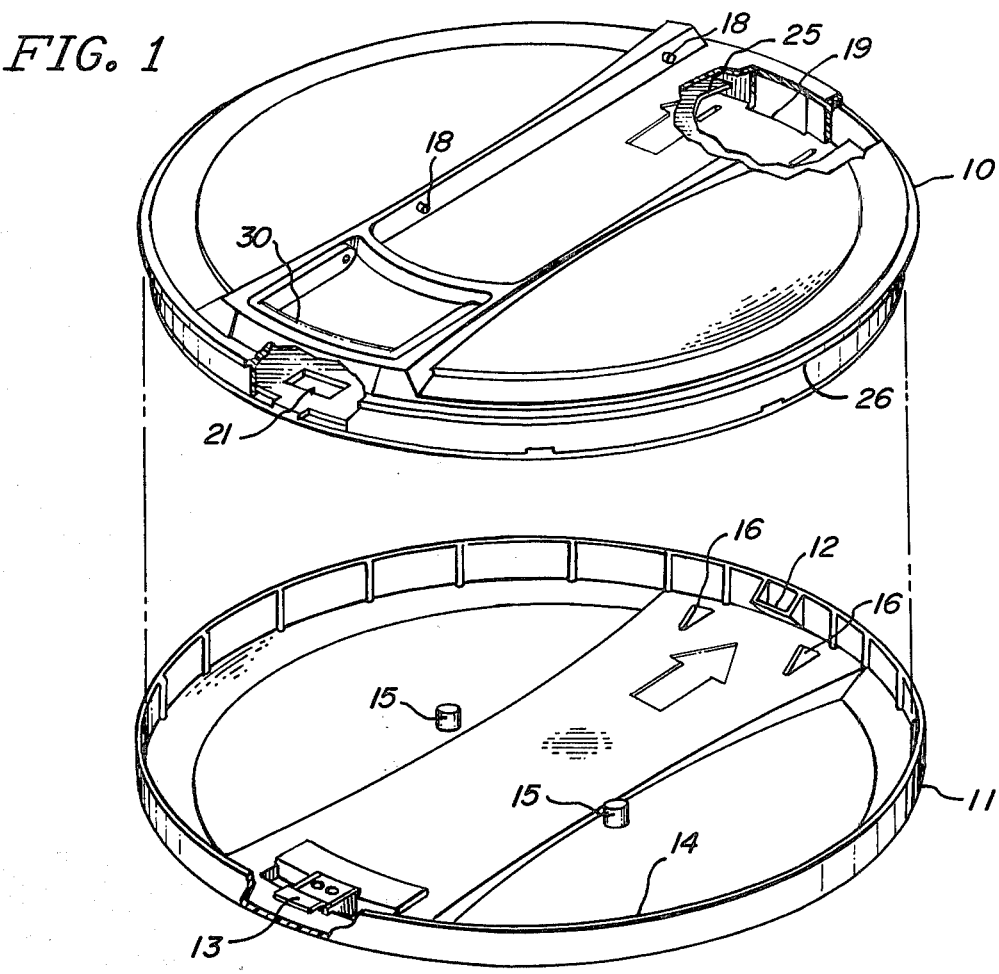
FIG. 1 is a perspective view of the dust shield and the housing detached from it.
Figure 2:
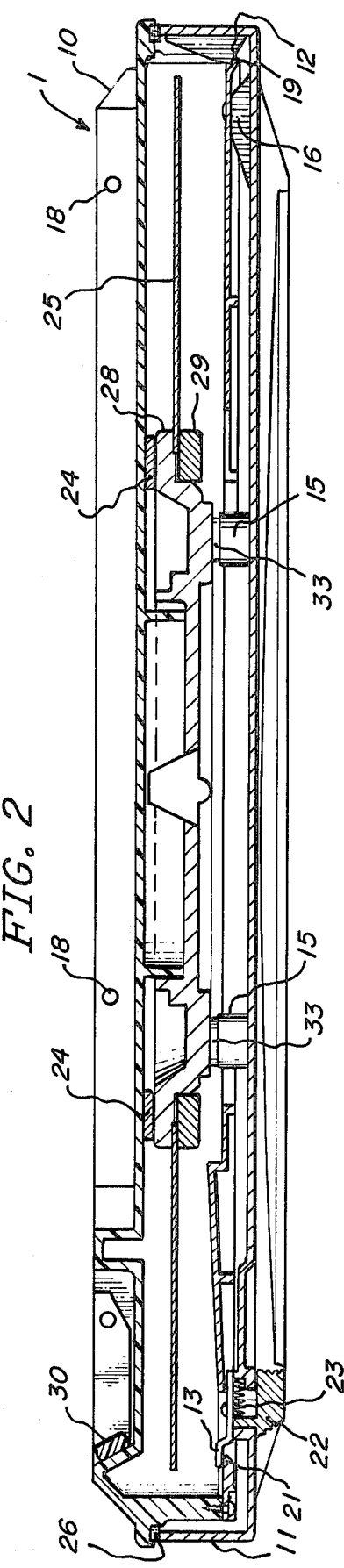
FIG. 2 is a cross-sectional view of the housing with a dust shield attached to it.
Figure 3:
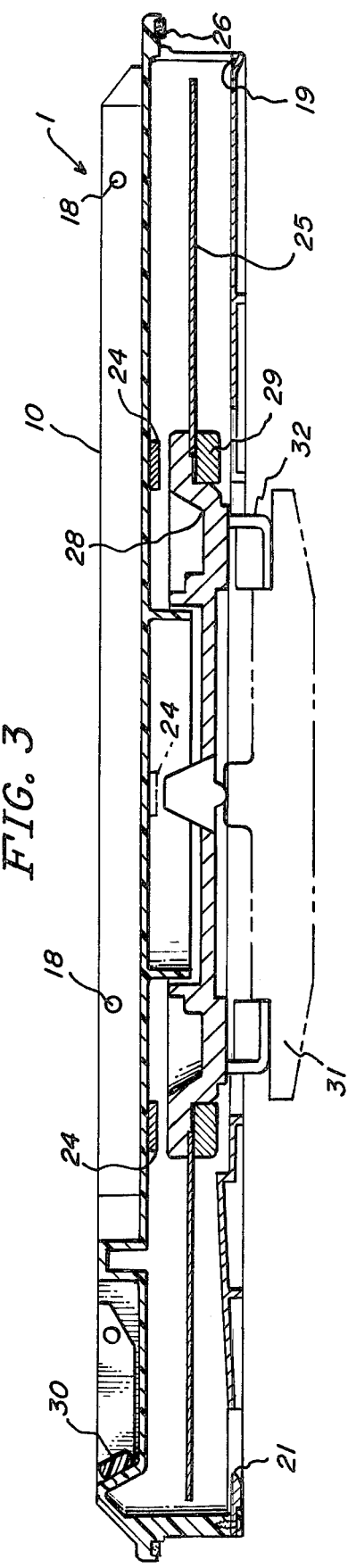
FIG. 3 is a cross-sectional view of the housing attached to the drive.

In FIG. 1, cover 11 is shown detached from housing 10 in an "exploded" position. Within housing 10, disc 25 is shown around the edge of the upper cutaway. Pins 18 are used by the drive to support and position housing 10. (The term "housing" will be used to mean the envelope, exclusive of the dust shield, enclosing the disc.) FIG. 2 shows a cross-section of module 1, which includes dust shield 11, shown attached. The disc mechanism inside includes disc 25 fastened to hub 28 by clamping ring 29 and machine screws 34 (FIG. 6) bolting ring 29 to hub 28. FIG. 3 shows housing 10 mounted in a drive unit with spindle 31 clamped to hub 28 through bottom opening 35 (FIG. 6) by the drive units magnet 32. In this position, spindle 28 and disc 25 are totally clear of housing 10 and the various elements within it and thus can rotate without rubbing on anything.

FIG. 2 shows the elements which attach dust shield 11 to housing 10. On the right side, lip 19 engages projection 12 to prevent axial movement of that side of housing 10 with respect to shield 11. On the left side, almost diametrically opposed thereto and adjacent the periphery of housing 10, latch 13 engages striker 21 to lockingly engage this side of shield 11 with housing 10.

Figure 6:
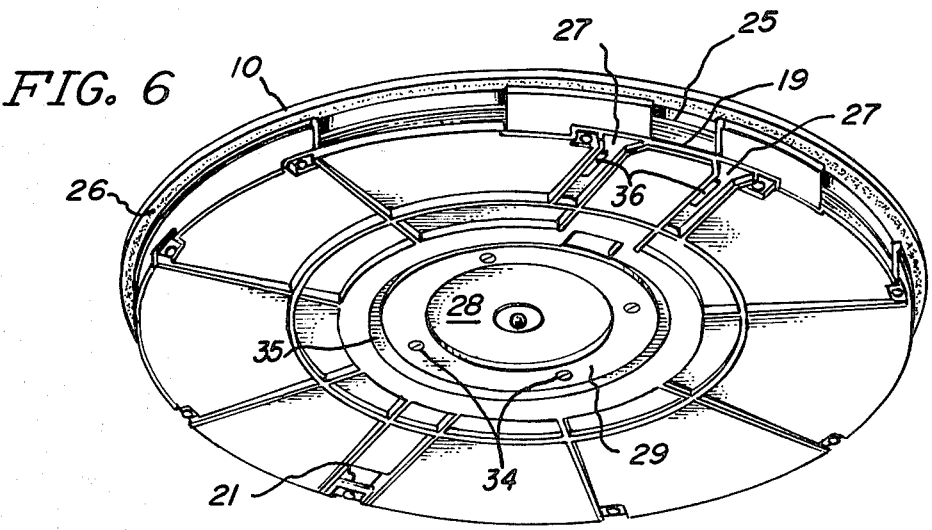
FIG. 6 is a perspective view of the bottom of the housing with the dust shield detached.

The procedure for attaching dust shield 11 to housing 10 is best understood by referring to FIGS. 1, 4, 5 and 6. Housing 10 is maneuvered to place guide projections or lugs 16 in radially oriented coverging channels or guideways 27 (FIG. 6). Housing 10 is slipped radially with respect to dust shield 11 and guided by lugs 16 in channels 27 so that lip 19 preliminarily engages projection 12 (FIG. 4). When lip 19 contacts projection 12, then the opposite side of housing 10 is pushed downwards so that latch 13 contacts the outer surface of striker 21. Latch 13 cams against this surface of striker 21 (FIG. 5) causing latch 13 and knob 22 to slide to the right, compressing spring 31. When the left side of dust shield mating surface 14 contacts mating surface gasket 26 and compresses it slightly, the relationship between latch 13 and striker 21 is such that latch 13 is released allowing spring 31 to force it into the latched position (FIG. 2). At the same time this operation is occurring, lip 19 and projection 12 are camming against each other to force dust shield mating surface 14 on the right side of FIG. 4 toward gasket 26, causing gasket 26 to be slightly compressed on that side. During the operations, lugs 16 slip into slots 36 so as to not interfere with the camming action.

Furthermore, while this operation is occurring, support studs 15 contact the bottom surface of hub 28 and lift the hub and disc assembly upwards so that when latch 13 latches with striker 21, hub 28 is being pushed against support pads 24 to form a friction grip preventing radial sliding of the hub and disc assembly and a positive lock to prevent axial movement thereof. Studs 15 include resilient pads 33 on their ends to adjust for dimensional inaccuracy and to increase frictional opposition to sliding of the disc when dust shield 11 is attached.

To detach dust shield 11 from housing 10, one need merely slide button 22 to the right to disengage latch 13 from striker 21 releasing housing 10 and lift housing 10, with or without the help of handle 30 at its left side so that it clears dust shield mating surface 14, as shown in FIG. 4. Then housing 10 is slipped slightly to the left relative to dust shield 11 freeing lip 19 from projection 12 and allowing housing 10 to be lifted clear of dust shield 11. Studs 15 allow hub 28 to drop down until ring 29 rests on the upper surface of the bottom of housing 10 supporting the hub and disc assembly.

In the preferred embodiment, support pads 24 are preferably arranged at 90 degree intervals around the bottom of the upper surface of assembly 10. At least two of these pads 24 should be spaced with respect to the disc's axis of rotation, different from the angular orientation of support studs 15.

We claim:

1. A disc memory module for mounting in a drive unit, of the type including a housing loosely enclosing the disc and having at least one aperture permitting access to the disc within by the drive unit, and having a dust shield mating surface and a detachable dust shield mating therewith, in combination sealing each aperture from ambient air, said dust shield to be detached and reattached to the housing respectively just before and just after the time the module occupies the drive unit, wherein the improvement comprises
   (a) a projection and lip, one of each carried by each of the housing and dust shield adjacent their peripheries, and arranged to lockingly engage when the dust shield is mated with the module housing; and
   (b) a latch and striker, one of each carried by each of the housing and dust shield adjacent their peripheries and opposite the projection and lip arrangement, and arranged to lockingly engage each other when the edge of the dust shield adjacent is pushed into the mated position with the module housing, and further including a release mechanism allowing the latch and striker to disengage each other.

2. The module of claim 1, wherein the projection and lip face radially, relative to the disc, and toward each other when the projection is withdrawn from the lip, and engage by radial, relative to the disc, motion of the projection toward and into the lip.

3. The module of claim 2, wherein the projection is carried by the dust shield, and the lip is carried by the housing.

4. The module of claim 3, wherein the latch is carried by the dust shield, and the striker is carried by the housing.

5. The module of claim 2, wherein the projection includes a camming surface facing toward the lip when the dust shield is mated with the housing, said camming surface sliding on the lip and urging the dust shield toward the housing during the radial movement engaging the projection with the lip.

6. The module of claim 2, wherein the lip and projection are carried at first points of the shield and housing, and further comprising a guide projection adjacent the first point on the housing directed toward the dust shield when the dust shield is in a mated position, and converging channel means within the dust shield generally radially oriented adjacent the first point and having decreasing width with decreasing radius relative the disc, (i) for engaging the guide projection when the housing is in the dust shield with the lip and projection facing each other and spaced apart preparatory to moving the housing into mated position with the dust shield and (ii) for guiding the lip into preliminary engagement with the projection.

7. The module of claim 2, wherein the mating surface of the housing includes a resilient gasket facing and contacting the dust shield and compressed by it, all when the dust shield is in its mated position with the housing.

8. The module of claim 1, wherein the disc includes a central rigid hub portion and the housing includes a central opening exposing the disc hub and enclosed by the dust shield, wherein a further improvement comprises
   (a) at least two resilient support pads attached to the inside upper surface of the housing and projecting toward the disc hub and spaced from it when the hub is in contact with the lower surface of the housing; and
   (b) at least two support studs attached to the inside surface of the dust shield and positioned to bear against the disc hub when the dust shield is in its mated position, of length sufficient to press the disc hub against the support pads when the shield is in its mated position, and approximately diametrically spaced with respect to each other.

9. The module of claim 8, wherein each support stud include a resilient pad on its end.

* * * * *